United States Patent [19]

Dvorak

[11] 4,184,389

[45] Jan. 22, 1980

[54] MANUAL WIRE CUT AND STRIP TOOL

[75] Inventor: Jarda Dvorak, Ringwood, N.J.

[73] Assignee: O.K. Machine and Tool Corp., New York City, N.Y.

[21] Appl. No.: 947,857

[22] Filed: Oct. 2, 1978

[51] Int. Cl.² .............................................. H02G 1/12
[52] U.S. Cl. ...................................... 81/9.5 B; 30/91.2
[58] Field of Search ................. 30/90.1, 91.2, 145, 30/176; 81/9.5 R, 9.5 B, 9.5 C

[56] References Cited

U.S. PATENT DOCUMENTS

| 1,490,459 | 4/1924  | Fergusson | 81/9.5 B   |
| 2,609,716 | 9/1952  | Forman    | 30/91.2    |
| 2,806,325 | 9/1957  | Fox       | 81/9.5 B X |
| 3,771,222 | 11/1973 | Sakuma    | 30/90.1    |
| 3,881,248 | 5/1975  | Kaufman   | 30/90.1    |

Primary Examiner—James G. Smith

[57] ABSTRACT

A manual tool for cutting an insulated electrical wire, and stripping the insulation from the free end of the wire is described. The tool comprises a folded spring steel member having flanged edges forming along one side a cutter slot for cutting the wire when the tool is squeezed, and along the opposite side a stripping slot for stripping the insulation from the cut wire end.

9 Claims, 9 Drawing Figures

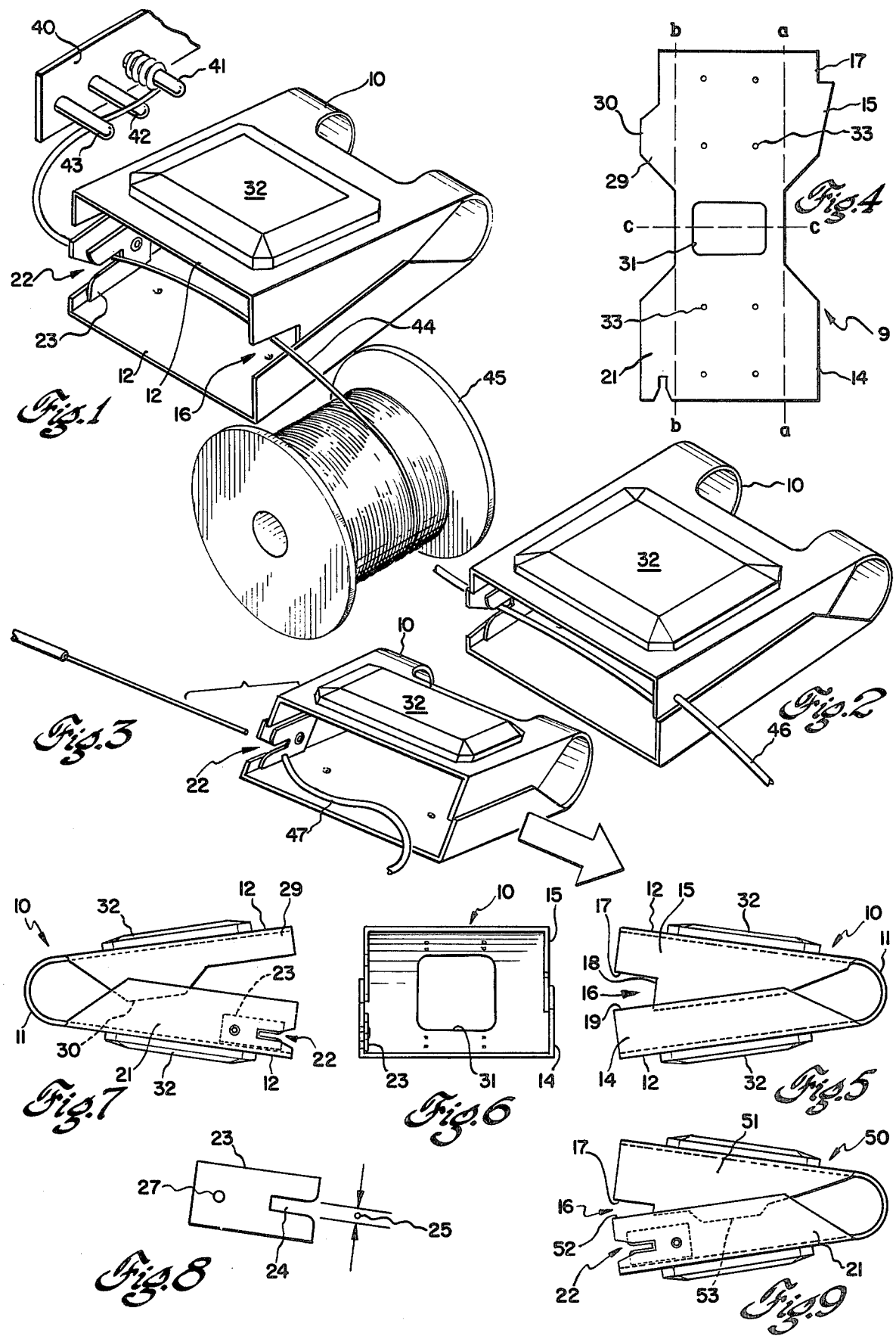

MANUAL WIRE CUT AND STRIP TOOL

This invention relates to a hand tool for cutting an insulated electrical wire, and for stripping the insulation from the cut wire end.

Reference is made to a commonly assigned, U.S. Pat. No. 3,881,248, whose contents are hereby incorporated. That patent describes a hand tool with a stripper and cutter mounted on a handle and having a similar function to that of the tool of the present invention.

The principal object of the present invention is a simple, compact, inexpensive hand tool expecially adapted for cutting and stripping the insulation from small gauge electrical wires intended for making wired connections for electronics and telephonic equipment.

This object is achieved by a tool comprising a generally U-shaped resilient body forming opposed arm portions whose edges are provided with flanged portions on which are formed or mounted a cutter slot and a spaced stripping slot. The electrical wire is located within the open end of the tool so as to be positioned within the cutter and stripping slots. When the tool is squeezed to its closed position, the wire is severed within the cutter slot. Pulling of the wire through the tool then results in the insulation being stripped off the free end of the cut wire.

This and further objects and advantages of the invention will be better understood from the description that follows hereinafter of several exemplary embodiments of the invention, taken in conjunction with the accompanying drawings wherein:

FIGS. 1, 2 and 3 illustrate how one form of tool in accordance with the invention is used to cut and remove the insulation from an electrical wire in preparation for wire-wrapping the stripped wire end onto an electrical terminal;

FIG. 4 is a plan view of formed sheet metal prior to folding to form the main body of the tool illustrated in FIGS. 1-3; FIG. 5 is a side view of the tool illustrated in FIGS. 1-3;

FIG. 6 is an end view of the tool shown in FIG. 5;

FIG. 7 is view of the opposite side of the tool shown in FIG. 5;

FIG. 8 is a plan view of the stripper plate used in the tool shown in FIG. 5;

FIG. 9 is a view similar to FIG. 5 of a modification.

As illustrated in FIGS. 5-7, one embodiment of a tool in accordance with the invention comprises a main body 10 having a generally U-shaped form with a bight portion 11 and opposed arm portions 12. Each of the arms 12 have along opposite side inwardly extending flanged portions. The body 10 is preferably constituted of spring steel, as, for example, type 410 stainless steel. The configuration illustrated in FIGS. 5-7 is readily fabricated at low cost by stamping from a sheet of spring steel, for example of 0.020 inches thickness, a flat shape 9 in the form illustrated in FIG. 4, following which the flanged edges are formed by folding the stamping along the axes a—a and b—b, and then the U-shaped formed by folding about the axis c-c. As will be ovserved, the flanged edges slightly overlap, and are positioned adjacent one another. The spring steel maintains the tool in the open position illustrated in FIGS. 5-7.

Two of the flanged edges 14 and 15 along side of the arms 12 form a cutter slot 16 for the insulated wire. The cutter slot 16 is formed by a cut-out section 17 along the flanged edge 15, forming a shoulder 18 which acts as a stop. The cutter slot 16 is sized to accommodate the insulated wire, and the shoulder 18 acts to prevent the wire from sliding down the flange edges to the bight 11. FIG. 5 shows the tool in its open position for receiving the wire. When the tool is squeezed between the fingers and thumb of a user into its closed position, a wire in the cutter slot 16 will be servered by the shear action of the closing edges 17 and 19. When the tool is released, the resilience of the spring metal restores it to its open position.

On one of the flanged edges 21 along the opposite side of the tool (FIG. 7) is provided a stripping slot 22. In a preferred emobdiment, the stripping slot is formed by a additional plate 23 of thin hardened tool steel similar to the inner plate of the sandwich arrangement forming the stripper described in the aforementioned patent. FIG. 8 is a plan view of the additional plate 23, which comprises a slot 24, widened at the entrance, which narrows down to form substantially parallel edges spaced apart to form a width, indicated by reference numeral 25, which slightly exceeds the diameter of the bare wire core of the insulated wire, but which is smaller than the diameter of the insulated wire. When the insulated wire is pulled or pushed into the slot 24, the slot edges slice through the insulation, so that when the wire is pulled through the slot, the insulation is stripped off of the wire. The stripper plate 23 is provided with a hole 27 by which it can be mounted, as for example by riveting, on the inside end of the flanged edge 21, as shown in FIGS. 6 and 7, so that the slot entrance faces away from the bight 11. The flanged edge 21 has been provided, as will be evident from FIG. 4, with an enlarged slot over which the stripper plate 23 is positioned.

The corresponding flanged edge 29 on the opposed arm 12 is provided with a projecting edge 30 which acts as a stop. When the tool is squeezed shut, the edge 30 engages the arm 12 and prevents further closing movement.

A hole 31 is provided in the bight 11 to reduce the pressure needed to squeeze the tool to its closed position. In addition, trim pieces 32, for example of plastic, are mounted on the major outer sides of the arms 12. For this purpose, locating holes are provided as shown at 33 in FIG. 4 for receiving small projections on the trim pieces, which can be than be glued or otherwise secured to the metal arms.

FIGS. 1-3 illustrate how the tool may be used in an application which will demonstrate several of its advantages. FIG. 1 shows a terminal board 40 having several upstanding terminals 41-43, two of which, 41 and 43, require interconnection by a wire wrapped lead. While the stripped wire can of coarse be connected to the terminal by many techniques well known in the art, such as by soldering or by insertion into a bifurcated terminal end, as the electronic components become smaller and smaller, wire wrapping becomes more and more the technique of choice. In this application, the two outer terminals 41 and 43 are to be connected with a wrapped wire connection. To make the first connection illustrated at the right, a wire pulled from a spool is inserted in the cutter slot 16 while the tool is held between the thumb and middle finger of the user, and the excess wire is then held against the tool side by the user+s finger while the spool side of the wire is pulled down into the stripping slot 22. Next, the tool is squeezed to its closed position, cutting off the excess wire remote from the spool. Next, the spool side of the wire is pulled, or the tool moved away from the spool, so as to pull the wire through the stripping slot 22, stripping the insulation from the wire end extending between the two slots, that is, the "shiner" length of stripped wire equals the tool width, the horizontal dimension in FIG. 6. The stripped end can then be wrapped on the terminal 41 as shown in FIG. 1. Following this, the wire 44 from the spool 45 is positioned adjacent the connecting terminal 43 and the tool positioned as illustrated in FIG. 1 with the stripping slot 22 nearer the terminal. Now, the insulated wire 44 is slid into the stripping slott 22 and into the cutter slot 16 as shown in FIG. 2. As earlier described, the tool is then squeezed closed, cutting off the excess wire 46 still connected to the spool. The tool held manually by the user is then moved in the direction shown by the arrow in FIG. 3 away from the terminals, stripping off the insulation from the wire end, the stripped insulation being shown at 47. The stripped wire end can then be wrapped around the terminal 43 on the left.

Because of the compactness of the tool and its flat configuration, the side of the tool with the stripping slot can be located close to the terminal 43 on which the wire is to be wrapped. Thus, the wire lead from terminal 41 to 43 can be kept short. Moreover, when the tool is moved laterally to strip the insulation while held by the fingers of the user, excessive pull on the terminal 41 can be avoided because the user can exercise more control over the amount of pull needed than in the case where the tool has a handle and is held in the palm of the user. Thus, with the fine terminals encountered in modern electronic equipment, there is a smaller likelihood of the terminal 41 bending.

The tool described herein has employed successfully to cut and strip insulation from AWG #30 electrical wires for wire wrapping onto 0.025 inch square terminals. To illustrate the small size of the tool, the width of the tool (the horizontal dimension in FIG. 6) was about one inch, the length of the tool (the horizontal dimension in FIG. 5) was about one and one-half inches, and the thickness of the tool in its open position (the vertical dimension in FIG. 6) was about six-tenths of an inch. The tool would also be useful for cutting and stripping wire sizes in the range of AWG #24-28, insulated with KYNAR and similar plastic insulating materials. For the specific embodiment described having a width of one inch, the "shiner" length of stripped wire will also be about one inch. This is an appropriate length for wire wrapping the bare end with a hand or power tool. The low cost manufacture of the tool will be evident to those skilled in this art.

In the embodiment so far described, a single cutter slot was located on one side of the tool, and a single stripping slot was located on the opposite side of the tool. In the modification illustrated in FIG. 9, the tool is made symmetrical so as to have a cutter slot and a stripping slot on both sides and thus will be capable of cutting and stripping on either side. FIG. 9 illustrates the side of the modified tool 50, the opposite side being identical. The same reference numerals are used to designate parts that correspond to the first embodiment. Thus, each side of the tool is provided with a flange 21 at the bottom of which is mounted a stripping slot 22 employing the stripper plate illustrated in FIG. 8. The adjacent flange 51 is provided with a cut-out 17, similar to FIG. 5, to provide a cutter slot 16. The cutting action occurs between the edge 17 on flange 51 and/edge 52 on the flange 21. In this embodiment, a stop 53, similar to the stop 30 in FIG. 7, is provided on the flange 51.

While my invention has been described in connection with specific embodiments thereof, those skilled in the art will recognize that various modifications are possible within the principles enunciated herein and thus the present invention is not to be limited to the specific embodiments disclosed.

What is claimed is:

1. a manual wire cutting and insulation stripping tool comprising a generally U-shaped resilient body having opposed arm portions of sufficient lateral area to accomodate the fingers and thumb of a user for squeezing together the arm portions from an open to a closed position, each of said arm portions having along one side adjacent flange portions extending toward the opposed arm portions forming along said one side a cutter slot for receiving an insulated wire and capable when the body is squeezed to the closed position of severing the insulated wire when in the cutter slot, and means mounted along the opposite side of one of said arm portions forming a stripping slot for receiving the insulated wire and slicing through the insulation whereby when the wire is pulled through the stripping slot the insulation is stripped therefrom, said stripping slot being spaced from the cutter slot by the width of the body as measured between its sides.

2. A manual wire cutting and stripping tool as claimed in claim 1, wherein stop means are provided on at least one of the arm portions for limiting the closing movement of the arm portions when squeezed together.

3. A manual wire cutting and stripping tool as claimed in claim 2, wherein the stop means comprises on one of the arm portions a flanged portion configured to engage the other arm portion in the closed position of the body.

4. A manual wire cutting and stripping tool as claimed in claim 1, wherein the width of the body corresponds to the length of the wire end to be stripped of insulation.

5. A manual wire cutting and stripping tool as claimed in claim 1, wherein the body comprises a folded strip of spring steel.

6. A manual wire cutting and stripping tool as claimed in claim 5, wherein the cutter slot is formed by a cut-out section of a flanged portion on one of the arm portions, the stripping slot is located on a flanged portion of the other arm portion along its opposite side, and the said one arm portion has along its opposite side a flanged portion configured to engage the other arm portion in the closed position of the body.

7. A manual wire cutting and stripping tool as claimed in claim 6, wherein the stripping slot is formed by a thin metal plate mounted on the flanged portion of the other arm portion and having a slot configured to receive and slice through the insulation of the insulated wire, the slot having an open end extending in a direction away from the bight of the U-shaped body.

8. A manual wire cutting and stripping tool as claimed in claim 1, wherein the cutter and stripping slots extend in opposed parallel planes.

9. A manual wire cutting and stripping tool as claimed in claim 1, wherein means are provided on each of both sides of the body forming on each side both a cutter slot and a stripping slot.

* * * * *